United States Patent
Wee et al.

(10) Patent No.: US 10,796,337 B2
(45) Date of Patent: Oct. 6, 2020

(54) REALTIME FEEDBACK USING AFFINITY-BASED DYNAMIC USER CLUSTERING

(71) Applicant: Staples, Inc., Framingham, MA (US)

(72) Inventors: Timothy Wee, San Mateo, CA (US); Karthik Kumara, San Mateo, CA (US); Ryan Applegate, San Mateo, CA (US); Majid Hosseini, San Mateo, CA (US)

(73) Assignee: STAPLES, INC., Framingham, MA (US)

( * ) Notice: Subject to any disclaimer, the term of this patent is extended or adjusted under 35 U.S.C. 154(b) by 653 days.

(21) Appl. No.: 14/981,211

(22) Filed: Dec. 28, 2015

(65) Prior Publication Data

US 2017/0061481 A1 Mar. 2, 2017

Related U.S. Application Data

(60) Provisional application No. 62/210,931, filed on Aug. 27, 2015.

(51) Int. Cl.
*G06Q 30/02* (2012.01)

(52) U.S. Cl.
CPC ..... *G06Q 30/0254* (2013.01); *G06Q 30/0201* (2013.01)

(58) Field of Classification Search
CPC .................................................. G06Q 30/0201
See application file for complete search history.

(56) References Cited

U.S. PATENT DOCUMENTS

| | | | |
|---|---|---|---|
| 8,244,517 B2 | 8/2012 | Roy et al. | |
| 8,301,623 B2 | 10/2012 | Chakrabarti et al. | |
| 8,560,293 B2 | 10/2013 | Roy et al. | |
| 8,612,293 B2 | 12/2013 | Benyamin et al. | |
| 8,615,434 B2 | 12/2013 | Benyamin et al. | |
| 9,135,666 B2 | 9/2015 | Benyamin et al. | |
| 2008/0294617 A1 | 11/2008 | Chakrabarti et al. | |
| 2009/0171763 A1 | 7/2009 | Dong et al. | |
| 2010/0121624 A1 | 5/2010 | Roy et al. | |

(Continued)

FOREIGN PATENT DOCUMENTS

WO 08147718 A1 12/2008

OTHER PUBLICATIONS

Xiaofeng Dai "A joint finite mixture model for clustering genes from independent Gaussian and beta distributed data" BMC BioInformatics 2009, 10:165 (published May 29, 2009) (Year: 2009).*

(Continued)

*Primary Examiner* — Arthur Duran
*Assistant Examiner* — Breffni Baggot
(74) *Attorney, Agent, or Firm* — Patent Law Works, LLP

(57) ABSTRACT

The disclosure relates in some cases to a technology for selecting one or more promotions to be presented to online customers using Bayesian bandits and affinity-based dynamic user clustering In some embodiments, a computer-implemented method determines a set of offers is determined, and computes affinity scores measuring affinities of users to items included in the offers. The method builds an affinity score distribution for the offers and identifies clusters of affinity scores for the offers using the corresponding affinity score distribution.

13 Claims, 6 Drawing Sheets

(56) References Cited

U.S. PATENT DOCUMENTS

| | | | |
|---|---|---|---|
| 2012/0158489 A1* | 6/2012 | Benyamin | G06Q 30/0256 705/14.45 |
| 2012/0158518 A1 | 6/2012 | Benyamin et al. | |
| 2012/0303349 A1 | 11/2012 | Roy et al. | |
| 2013/0151334 A1 | 6/2013 | Berkhin et al. | |
| 2013/0218678 A1 | 8/2013 | Benyamin et al. | |
| 2014/0089084 A1* | 3/2014 | Benyamin | G06Q 30/0246 705/14.45 |
| 2015/0127464 A1 | 5/2015 | Benyamin et al. | |
| 2016/0321284 A1* | 11/2016 | Spears | G06Q 30/02 |

OTHER PUBLICATIONS

Wiley Encyclopedia of Computer Science and Engineering (Year: 2009).*

Rossi (University of Chicago), "Bayesian Statistics and Marketing", (2005) (Year: 2005).*

University of Chicago Press, Bayesian Statistics and Marketing, Peter Rossi & Robert McCulloch, Marketing Science pp. 304-328 (Year: 2003).*

University of Chicago Press, Peter Rossi, "Bayesian Statistics and Marketing", (2005) (Year: 2005).*

Model Selection for Gaussian Mixture Models Tao Huang, Heng Peng and Kun Zhang Jan. 17, 2013 (Year: 2013).*

Xiaofeng Dai "A joint finite mixture model for clustering genes from independent Gaussian and beta distributed data" BMC BioInformatics 2009, 10:165 (published May 29, 2009) (Year: 2009).*

University of Chicago, Bayesian Satistics and Marketing, Rossi and Allenby, Marketing Science vol. 22 No. 3 pp. 304-328 (Year: 2003).*

Bayesian information criterion, from Wikipedia, the free encyclopedia, https://en.wikipedia.org/wiki/Bayesian_information_criterion, downloaded on Dec. 15, 2015 (4 pages).

* cited by examiner

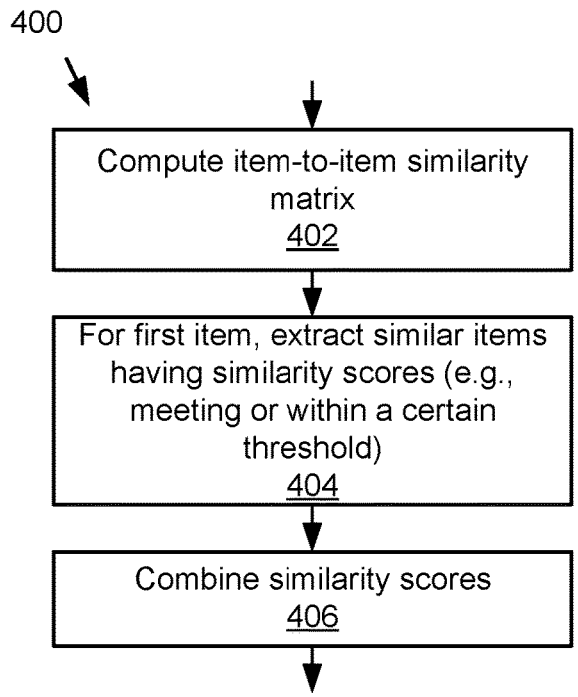
Figure 4
Figure 5
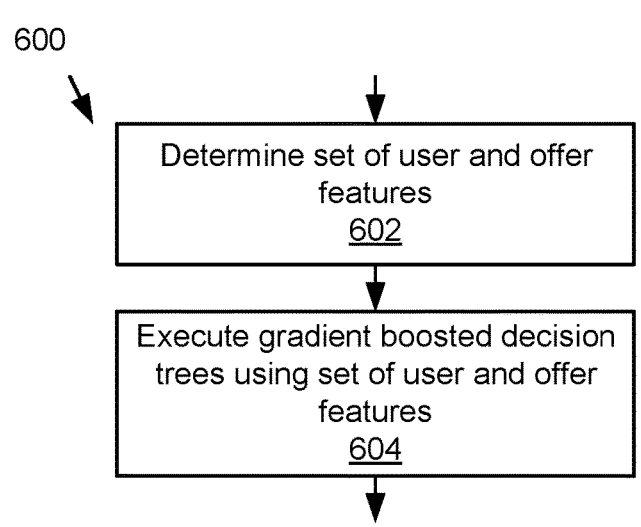
Figure 6

REALTIME FEEDBACK USING AFFINITY-BASED DYNAMIC USER CLUSTERING

CROSS REFERENCE TO RELATED APPLICATIONS

The present application claims the benefit under 35 U.S.C. § 119(e) of U.S. Provisional Application No. 62/210,931, filed Aug. 27, 2015, entitled "REALTIME FEEDBACK USING AFFINITY-BASED DYNAMIC USER CLUSTERING," the entire contents of which are incorporated herein by reference.

BACKGROUND

The present specification relates in some cases to a technology for selecting one or more promotions to be presented to online customers using Bayesian bandits and affinity-based dynamic user clustering.

In e-commerce, automatically personalizing digital content to users is particularly challenging because the demographics, interests, and actions of those users can vary widely. In many cases, existing solutions treat all the users as the same and provide each of them the same personalized content. As a result, only a small fraction of those users respond to the personalized content, such as an offer content presented to a user that includes a promotion for a given item. In other cases, various solutions attempt to determine each user's individual interests based on analytics the solutions have about the users. However, in order to make sense of the data, which can include a lot of variability and noise, and to simplify the amount of processing that is required at runtime, the algorithms used by these solutions are overly course-grained and thus often provide the same "personalized" content to users despite their varying preferences.

To better account for user interests and realtime user response, clustering technology that utilizes Bayesian bandits has been developed to provide personalization in its realtime feedback algorithms, such as that described in U.S. patent application Ser. No. 14/723,360 filed by Applicant and filed on May 27, 2015, the entire contents of which are incorporated herein by reference. The technology clusters users according to a priori information about their expected response to a bandit arm/offer, and incorporates user feedback separately for each cluster.

While this Bayesian bandit clustering technology provides an effective mechanism for accounting for realtime user response, in some instances, it keeps track of user response for an arm/offer using a single distribution and keeps a single offer response distribution/bandit arm for all users. As a result, the technology does not always account for variation in user preferences in some instances, which can be problematic because users typically have varying preferences for each offer, and which can cause a large amount of noise and poor convergence. Other approaches use discrete tags/segments to group users. However, these approaches are not offer-specific but function across all offers.

Still other approaches create user clusters and maintain a different distribution/bandit arm per cluster. While can be an improvement over the previously-noted Bayesian bandit technology, it does not account for the user preference/affinity distribution differences for particular offers on products. For instance, for printers, this approach is unable to account for a bifurcated/bimodal user-base (more than one cluster), such as people who own printers versus people who don't have printers, as well as something like toilet paper, which likely has a unimodal user base (a single cluster).

SUMMARY

According to one innovative aspect of the subject matter described in this disclosure, a system for realtime feedback using affinity-based dynamic user clustering includes: one or more computer processors; one or more non-transitory computer memories storing instructions that, when executed by the one or more computer processors, causes the system to: receive a set of offers; compute affinity scores measuring affinities of users to items included in the offers; build an affinity score distribution for each of the offers; and identify clusters of affinity scores for each of the offers using the corresponding affinity store score distribution.

Other aspects include corresponding methods, systems, apparatus, and computer program products for these and other innovative aspects.

These and other implementations may each optionally include one or more of the following features. For instances, the operations further include: receiving a content request; determining an offer including an item; retrieving user information for user associated with the content request; computing a user affinity score to the item of the offer using the user information; identifying a cluster that the user affinity score belongs to from among a plurality of clusters of affinity scores; retrieving a beta distribution corresponding to a cluster ID of the identified cluster; generating a response estimate using the beta distribution; determining to present the offer to the user based on the response estimate;

For instance, the features include: computing affinity scores comprises: determining a set of user and offer features; and executing a predictor model using the set of user and offer features. For instance, the features include: computing affinity scores comprises: computing an item-to-item similarity matrix; extracting, for each item, similar items with similar scores from the item-to-item matrix to form a similarity score to the item; and combining similarity scores to create an affinity score. For instance, the features include: identifying clusters comprises: executing, for each offer, an expectation-maximization (EM) algorithm to fit a Gaussian Mixture Model (GMM) to a score distribution; and selecting the GMM with a parameter that maximizes the Bayesian information criterion (BIC) metric.

The present disclosure may be particularly advantageous in a number of respects. By way of example and not limitation, the technology described herein allows a developer to maximize an overall quantitative business objectives, such as total click-through rate.

BRIEF DESCRIPTION OF THE DRAWINGS

The disclosure is illustrated by way of example, and not by way of limitation in the figures of the accompanying drawings in which like reference numerals are used to refer to similar elements.

FIG. 4 is a flowchart of an example method for generating and utilizing the score matrix.

FIG. 5 illustrates an example item-to-item matrix which uses a scale to reflect the level of similarity between the items in the matrix.

FIG. 6 is a flowchart of an example method for computing the user affinity score using gradient boosted decision trees.

DETAILED DESCRIPTION

Figure 1:
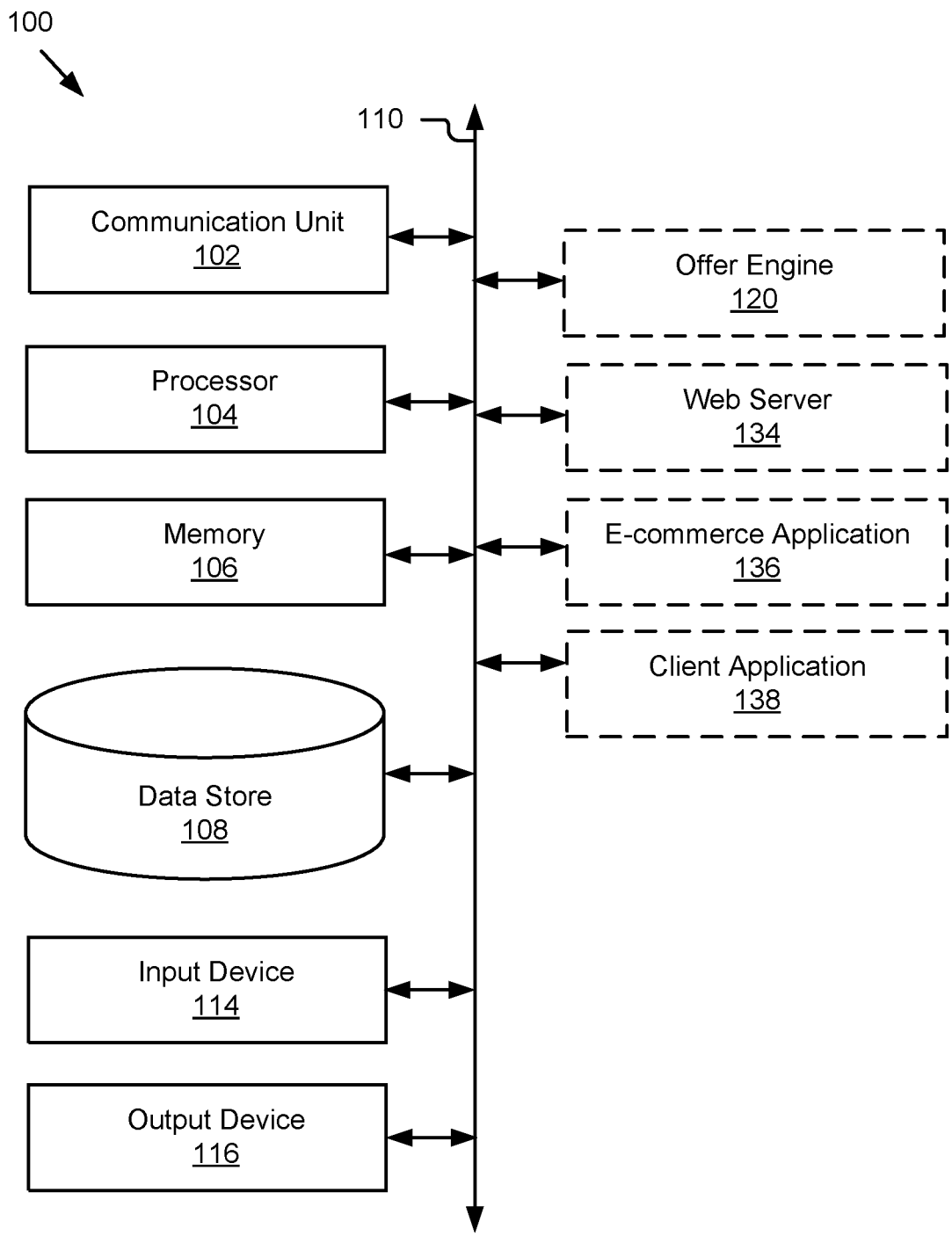
FIG. 1 is a block diagram of an example computing system.

The following description is given to aid in understanding the concept of promotion selection (e.g., advertisement selection, offer selection) using Bayesian Bandits, but this description is provided by way of example and should not be construed as limiting. The tradeoff between measuring the click-through rate and displaying the current best advertisement is one example of the explore/exploit dilemma. Where there are multiple unique explore/exploit systems, the term "arm" or "bandit arm" refers to each unique explore/exploit system. Bayesian Bandit algorithms discussed herein provide an elegant and principled solution to the explore/exploit dilemma via the technique of Thompson Sampling. Rather than an arbitrary separation between an explore phase and an exploit phase, the Bayesian Bandit algorithms (also simply referred to herein as Bayesian Bandits) model and update the click-through rates of the advertisements continuously. When asked to select an advertisement, the Bayesian Bandit algorithms draw samples from the click-through rate models and select the advertisement with a certain, such as the largest sampled value.

In general, the advertisement that provides the largest expected reward is generally selected, where the reward function may be chosen to maximize a chosen business objective, such as, but not limited to click-through rate (CTR), conversion rate, revenue, or margin.

The Bayesian Bandit can model each view or impression of an advertisement as a Bernoulli trial with probability parameter θ, which is the click-through rate (CTR) for the advertisement. As the click-through rates are generally not known in advance, the probability parameters are considered to be random variables in their own right, governed by probability distributions. Under a Bayesian approach, the probability distribution for a random variable reflects the state of knowledge about the variable. The prior distribution represents the state of knowledge before any data is seen. The posterior distribution reflects the state of knowledge of the variable after accumulating evidence. The posterior distribution is calculated using Bayes' Formula:

$$P(\theta \mid X) = \frac{P(X \mid \theta)P(\theta)}{P(X)}$$

The technology described herein utilizes Bayesian Bandit modeling to provide an innovative, fine-grained, non-trivial, approach to segmenting the users by offer affinity, which allows the offer to be better customized to each user or user type and increases user response to the offers. In segmenting the users and estimating affinity, the technology quantifies how close users relate to an offer. One approach used to estimate a user's preference treats each user as a list of items using item data associated with the user (e.g., using the user's historical clickstream data and purchase history data, which reflects items the user may have viewed, purchased, etc.) and then generates item-to-item similarity scores quantifying the similarity between each of the user's items and the offer's item(s). This matrix of scores for each user and offer can be used to generate user clusters. Another approach feeds online behavioral attributes and demographic attributes into prediction models that can estimate selection rates (click-through rates (CTRs)) based on the attributes.

Once estimated, the technology evaluates the affinity distribution and uses the distribution to identify user clusters for each offer. For instance, the technology generates a score distribution using the product preference/utility scores for each offer. Some of these distributions will be multimodal, which allows multiple user clusters for each offer to be identified to account for groups of users with different preferences (likes, situations, motivations, etc.).

In some implementations, to generate the clusters, for each user-offer pair, the technology computes a product preference score. For each product, the preference scores are compiled to form a preference/affinity distribution. The technology then clusters users for a particular product/offer according to this affinity distribution. An example clustering method is using a mixture of Gaussians. For instance, the technology may fit an increasing number of Gaussians to the distribution, and add a penalty term with the number of Gaussians to prevent overfitting the empirical preference distribution. Each Gaussian in the mixture represents a cluster of users.

At runtime, the technology can identify which cluster a given user belongs to when a content request is received or otherwise triggered by identifying the Bayesian bandit arm that the user corresponds to. Once the arm is determined, the offer for the response can be determined. Depending on the implementation, for each offer, there may be one distribution for each of its clusters. The bandit can keep a different number of arms/response distributions per offer, one for each of its clusters.

Continuing the above example, the technology can identify the cluster the user belongs to, by computing the max(P(cluster_i|user)). This can be carried out using the user's preference score for a product and passing that score to each Gaussian's probability density function (PDF) to determine which distribution is more applicable. Some of the users might be equally likely to be in 2 or more clusters. To handle these cases, we can soft-assign users to clusters (called soft clustering) by computing a probability score P(cluster_a|user1)/ sum_over_i_(cluster_i|user1). The technology can assign a user's actions (views, clicks, etc.) to each cluster's response distribution in proportion to this probability score. This means that instead of a single response distribution getting the entire interaction (e.g., view or click, etc.), the technology splits/allocates a percentage of the interaction in proportion to the probability of a user belonging to a particular cluster.

Figure 10:
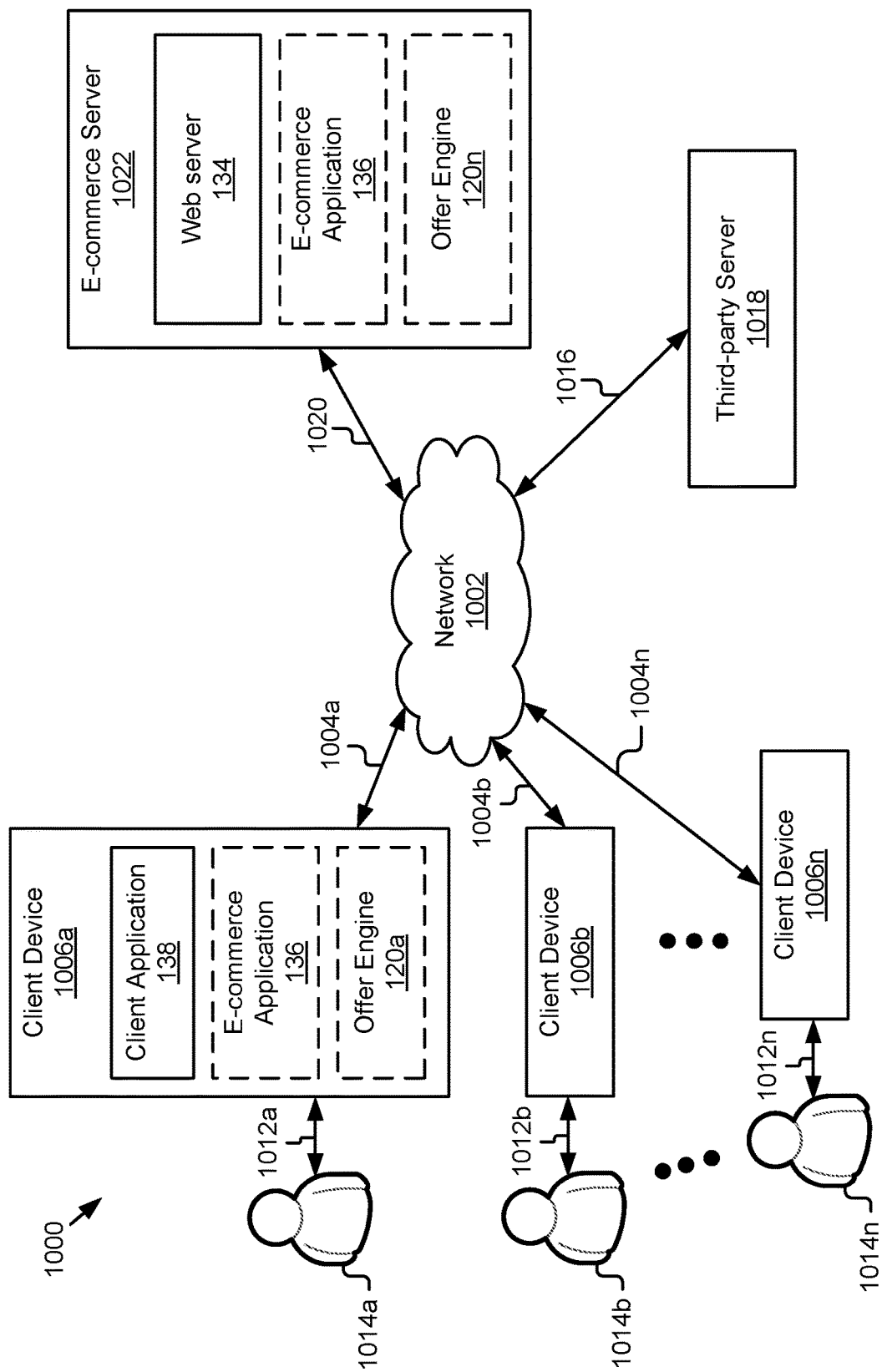
FIG. 10 is a block diagram of an example system.

FIG. 1 is a block diagram of an example computing system 100, which may represent the computer architecture of a client device 1006, a third-party server 1018, and/or an e-commerce server 1022, as depicted in FIG. 10, depending on the implementation.

As depicted in FIG. 1, the computing system 100 may include an offer engine 120, a web server 134, an e-commerce application 136, and/or a client application 138, depending on the configuration. For instance, a client device 1006 may include one or more of the client application 138, the offer engine 120, the e-commerce application 136, and/or components thereof; and the e-commerce server 1022 may include the offer engine 120, the web server 134, and/or the e-commerce application 136, and/or components thereof, although other configurations are also possible and contemplated.

The components 120, 134, 136, and/or 138 may include computer logic (e.g., sets of instructions, software, etc.) storable in the memory 106 and executable by the processor 104 to program the processor 104 to perform the acts and/or functionality described herein, and/or implemented in the processor 104 in hardware form (e.g., ASIC, FPGA, ASSP, SoC, circuitry, etc.) to perform the acts and/or functionality described herein. These computer-executable components may sometimes be referred to in this document as the actor (in the third person) for convenience and so as not to obscure the acts, operations, and functionalities (also referred to simply as operations) carried out by them. These components and/or their sub-components may be adapted for cooperation and communication with the processor 104 and other components of the computing system 100.

The offer engine 120 includes computer logic that, when executed, programs the processor 104 to cluster users based on user-offer affinity and use the clusters to more effectively identify a relevant offer at runtime, as discussed further herein. In particular, the offer engine 120 can program the processor 104 to compute affinity scores for users and offers, build affinity score distributions, cluster users based on where their affinity scores fall within the distribution, and reference the clusters at runtime to determine the relevance of an offer to a given user. The offer engine 120 is coupled to the data store 108 to store, retrieve, and/or manipulate data stored therein and may be coupled to the e-commerce application 136, the web server 134, the client application 138, and/or other components of the system 100 to exchange information and/or to call functions and/or store, update, and/or retrieve data therefrom. The set of offers may be retrieved from the data store 108 or may be transmitted from another server such as 134, 136, 138, 1018, and 1022. In some cases, a client device 1006 may also participate in transmitting the set of offers operated on by the offer engine 120.

Figures 2, 3:
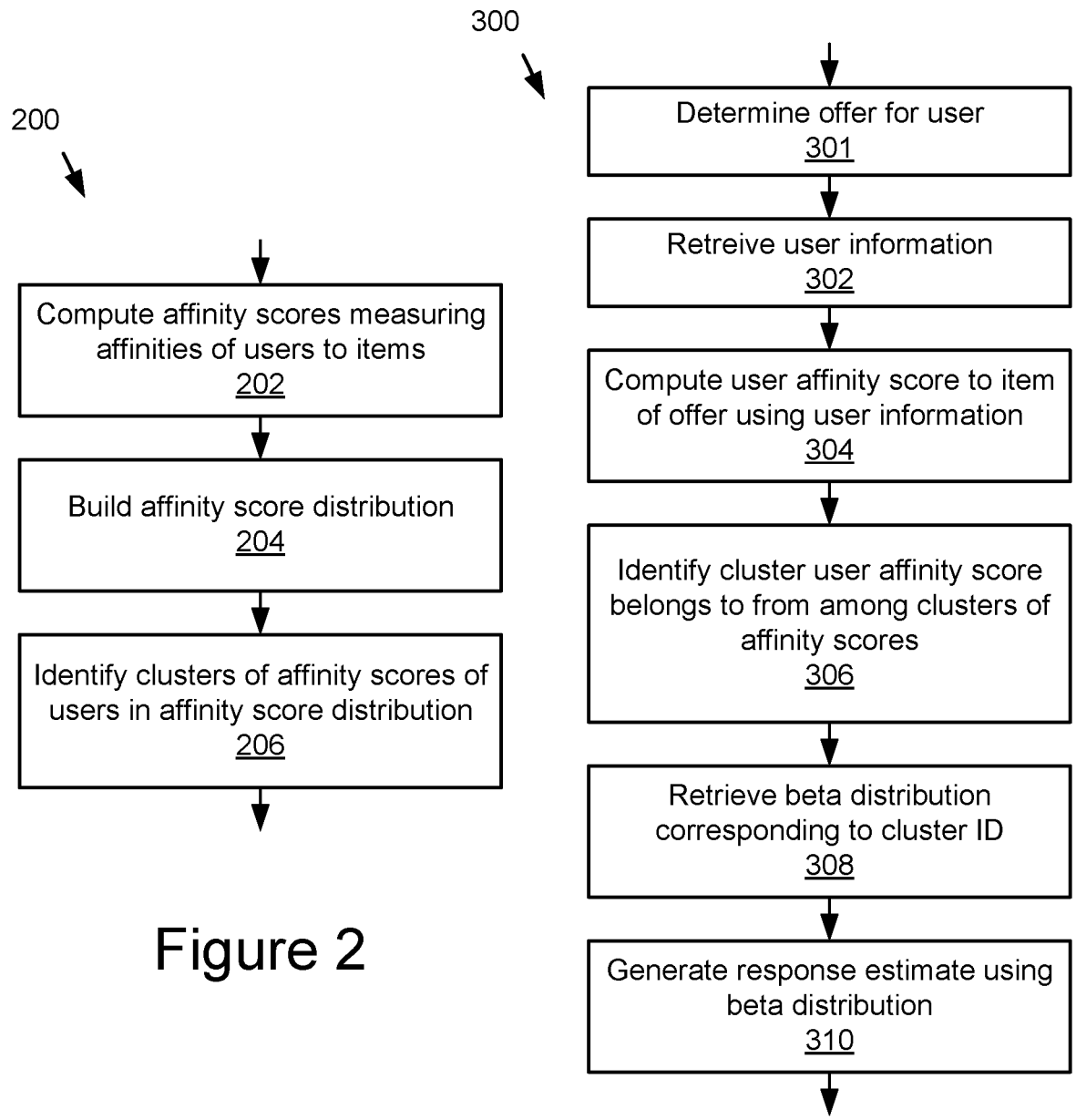
FIG. 2 is a flowchart of an example method for clustering users.
FIG. 3 is a flowchart of an example method for generating a response estimate.

FIG. 2 is a flowchart of an example offer method 200 for clustering users. In block 202, the offer engine 120 computes affinity scores measuring the affinity of users to items. In one example, the affinity of users to items may be found by generating an item-to-item similarity matrix. Items that get similar ratings when rated by the same user may receive a higher rating in the matrix. Similar items with similar scores from the item-to-item matrix may be used to form a similarity score to the item. The similarity scores may then be combined to create the affinity score. In another example, the affinity of users to items may be found by determining a set of user and offer features, and executing gradient boosted decision trees (and/or other predictor models (e.g. neural networks, logistic regression, support vector machine, etc.)) using the set of user and offer features. These and other examples are discussed further elsewhere herein.

In block 204, the offer engine 120 builds an affinity score distribution. For example, the computed affinities may be segregated with decreasing granularity such that a continuous score distribution may be inferred, as discussed further elsewhere herein, and in block 206, the offer engine 120 may identify clusters of affinity scores of users in the affinity score distribution, which may be stored in the data store 108.

Figure 9:
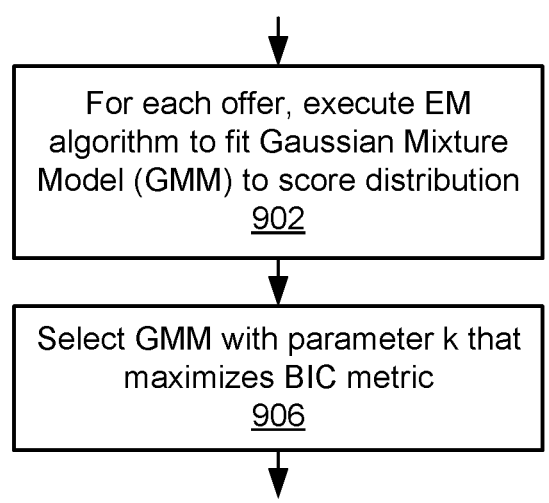
FIG. 9 is a flowchart of an example method for determining a model that maximizes a Bayesian Information Criterion (BIC) metric.

In some implementations, to identify the clusters, the offer engine 120 may fit a mixture of Gaussians to each affinity distribution. FIG. 9 is a flowchart of an example method 900 for determining a model that maximizes a BIC metric. In block 902, the offer engine 120, for each offer, executes an expectation-maximization (EM) algorithm to fit a Gaussian Mixture Model (GMM) to a score distribution. By way of further example, an algorithm may function as follows: for each offer, from k=1 . . . max_clusters, the algorithm fits a GMM (n_distributions=k) to the score distribution using the EM algorithm. The algorithm may use the Bayesian Information Criterion (BIC) metric to measure model fit as well as penalize the number of clusters used, as would be understood by an ordinary person skilled in the art. For instance, in block 904, the offer engine 120 then selects the GMM with the parameter k that maximizes the BIC metric, which is the number of clusters that are to be used.

Figure 8:
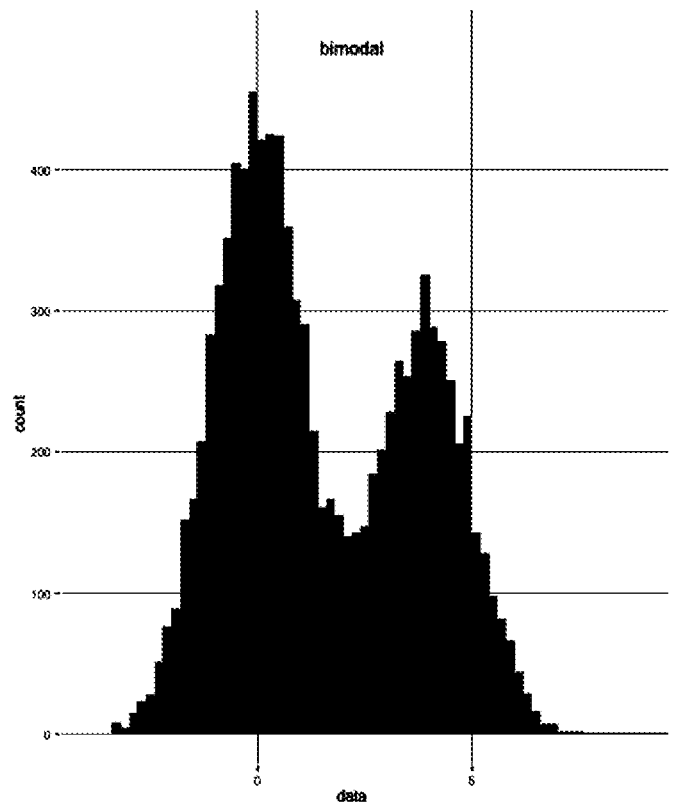
FIG. 8 is a graph illustrating a bimodal affinity score distribution.

FIG. 8 is a graph illustrating a bimodal affinity score distribution showing that the users may cluster around multiple points within the distribution (e.g., around 0 and 4). Advantageously, the technology disclosed herein can account for such a bimodal user affinity score distribution and utilize this phenomenon to provide more accurate offers, thus increasing conversion rates, profit, etc.

FIG. 3 is a flowchart of an example method 300 for generating a response estimate. In block 301, the offer engine 120 determines an offer for a user. In block 302, the offer engine 120 retrieves user information associated with the user from the data store 108. In block 304, the offer engine 120 computes a user affinity score to an item of the offer using the user information. This operation is completed for all applicable users, and the scores of the users are utilized to generate a user score distribution as discussed elsewhere herein.

In some implementations, the offer engine 120 computes the user affinity score by combining similar scores computed using a similarity matrix. FIG. 4 is a flowchart of an example method 400 for generating and utilizing the score matrix. In block 402, the offer engine 120 computes an item-to-item similarity matrix. In some implementations, the offer engine 120 may compute the matrix using neighborhood methods or latent factor/matrix factorization. In a neighborhood method, relationships between items in an item-oriented approach may be computed by evaluating a user's preference for an item compared to ratings of neighboring items by the same user to generate an affinity distribution for users and products. For instance, a product's neighbors are other products that get the same or similar (e.g., within 65%+) ratings when rated by the same user. In block 404, for first item, the offer engine 120 extracts similar items with similar scores. In some instances, the similar scores may be required to satisfy a certain threshold to be extracted, although in other implementations no threshold may be used. In block 406, the offer engine 120 combines the similarity scores to create an affinity score that can be used in the distribution.

FIG. 5 illustrates an example item-to-item matrix 500 which uses a scale (e.g., 0-1, where zero indicates no similarity and one indicates complete similarity, or vice versa) to reflect the level of similarity between the items in the matrix, although should be understood that matrix may have other dimensions and values, and that a different scale value may be used. In this example, given an offer for a item1 and a user U who has purchased item2 and item3, the offer engine 120 extracts item2 and item3's similarity scores measuring similarity of the items to item1 (0.25 and 0.5 respectively). The offer engine 120 can then combine the scores together (e.g., computing arithmetic mean, harmonic mean, max value, etc., of these scores). In some instances, computing the max scores can provide a reliable approximation of whether a user would be interested in a new product (e.g., item 1). In some cases, it is sufficient to consider a user interested if similarity score reflects that the user has purchased at least one very related product (e.g., >75% similarity), although other values are also appropriate and can be used.

In some implementations, the offer engine 120 computes the user affinity score using gradient boosted decision trees. In other implementations, the user affinity score may be computed with other predictor models, such as various neural networks, logistic regression, support vector machine, a combination of the foregoing, etc. FIG. 6 is a flowchart of an example method 600 for computing the user affinity score using gradient boosted decision trees. In block 602, the offer engine 120 determines a set of user and offer features. In block 604, the offer engine 120 executes gradient boosted decision trees using the set of user and offer features.

Figure 7:
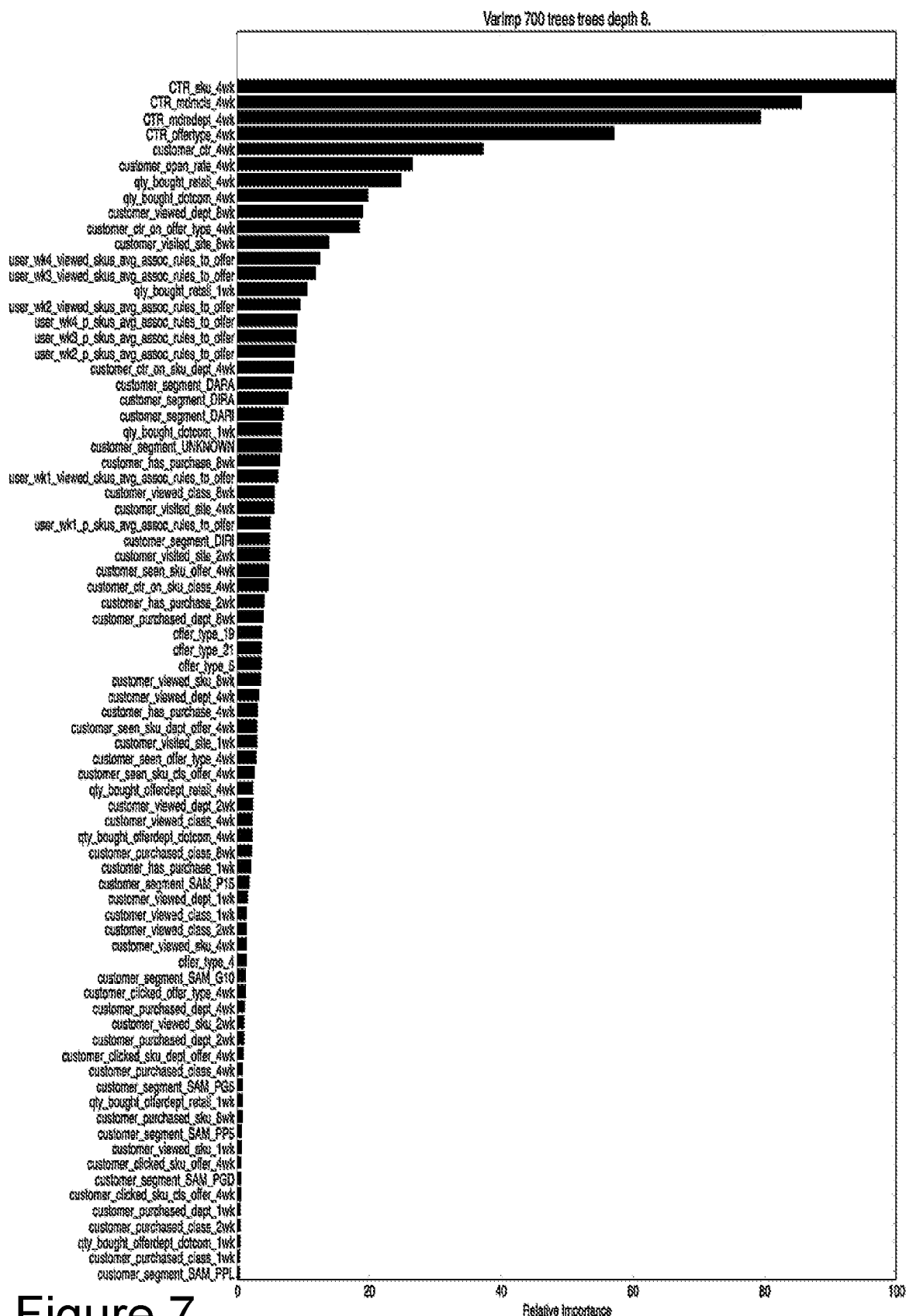
FIG. 7 depicts an example set of user and offer features.

FIG. 7 depicts an example set of user and offer features. In an example, the features are associated with an email offer, and may be determined by the offer engine 120 (e.g., in block 602 of method 600), along with relative importance scores for each of the features determined using a certain size and depth (e.g., 700 trees with a tree depth of 8). Using this approach, in which the user and offer attributes are input into a gradient boosted machine, the offer engine 120 can estimate the likelihood that a user will interact with (e.g., click on) a new offer (e.g., digital ad).

The following is an example of a feature vector including the above features that is used by the offer engine 120:

```
feature_vector_keys = [\
    "model", \
    "offer_type", \
    "customer_visited_site_1wk", \
    "customer_visited_site_2wk", \
    "customer_visited_site_4wk", \
    "customer_visited_site_8wk", \
    "customer_viewed_sku_1wk", \
    "customer_viewed_sku_2wk", \
    "customer_viewed_sku_4wk", \
    "customer_viewed_sku_8wk", \
    "customer_viewed_class_1wk", \
    "customer_viewed_class_2wk", \
    "customer_viewed_class_4wk", \
    "customer_viewed_class_8wk", \
    "customer_viewed_dept_1wk", \
    "customer_viewed_dept_2wk", \
    "customer_viewed_dept_4wk", \
    "customer_viewed_dept_8wk", \
    #"%_of_views_in_dept_4wk", \
    #"%_of_purch_in_dept_4wk", \
    "customer_has_purchase_1wk", \
    "customer_has_purchase_2wk", \
    "customer_has_purchase_4wk", \
    "customer_has_purchase_8wk", \
    "customer_purchased_sku_1wk", \
    "customer_purchased_sku_2wk", \
    "customer_purchased_sku_4wk", \
    "customer_purchased_sku_8wk", \
    "customer_purchased_class_1wk", \
    "customer_purchased_class_2wk", \
    "customer_purchased_class_4wk", \
    "customer_purchased_class_8wk", \
    "customer_purchased_dept_1wk", \
    "customer_purchased_dept_2wk", \
    "customer_purchased_dept_4wk", \
    "customer_purchased_dept_8wk", \
    #"customer_clicked_offer_type_1wk", \
    #"customer_clicked_offer_type_2wk", \
    "customer_clicked_offer_type_4wk", \
    #"customer_seen_offer_type_1wk", \
    #"customer_seen_offer_type_2wk", \
    "customer_seen_offer_type_4wk", \
```

-continued

```
    #"customer_clicked_sku_offer_1wk", \
    #"customer_clicked_sku_offer_2wk", \
    "customer_clicked_sku_offer_4wk", \
    #"customer_seen_sku_offer_1wk", \
    #"customer_seen_sku_offer_2wk", \
    "customer_seen_sku_offer_4wk", \
    "customer_clicked_sku_cls_offer_4wk", \
    "customer_seen_sku_cls_offer_4wk", \
    #"customer_clicked_sku_dept_offer_1wk", \
    #"customer_clicked_sku_dept_offer_2wk", \
    "customer_clicked_sku_dept_offer_4wk", \
    #"customer_seen_sku_dept_offer_1wk", \
    #"customer_seen_sku_dept_offer_2wk", \
    "customer_seen_sku_dept_offer_4wk", \
    #"customer_segment_ctr_sku_dept_offer_1wk", \
    #"customer_segment_ctr_sku_dept_offer_2wk", \
    #"customer_segment_ctr_sku_dept_offer_4wk", \
    "CTR_offertype_4wk", \
    "CTR_sku_4wk", \
    "CTR_mdmcls_4wk", \
    "CTR_mdmdept_4wk", \
    "customer_open_rate_4wk", \
    "customer_ctr_4wk", \
    "customer_ctr_on_offer_type_4wk", \
    "customer_ctr_on_sku_class_4wk", \
    "customer_ctr_on_sku_dept_4wk", \
    "customer_segment", \
    "is_business_customer", \
    "sku_viewrank_1wk", \
    "sku_viewrank_4wk", \
    #"sku_uniq_purchrank_1wk", \
    #"sku_uniq_purchrank_4wk", \
    #"sku_uniq_purchraw_1wk", \
    "sku_uniq_purchraw_4wk", \
    #"sku_rev_1wk", \
    "sku_rev_4wk", \
    # "sku_online_percent_overall_rev_1wk", \
    # "sku_online_percent_overall_rev_4wk", \
    "user_wk1_p_skus_avg_assoc_rules_to_offer", \
    "user_wk2_p_skus_avg_assoc_rules_to_offer", \
    "user_wk3_p_skus_avg_assoc_rules_to_offer", \
    "user_wk4_p_skus_avg_assoc_rules_to_offer", \
    "user_wk1_viewed_skus_avg_assoc_rules_to_offer", \
    "user_wk2_viewed_skus_avg_assoc_rules_to_offer", \
    "user_wk3_viewed_skus_avg_assoc_rules_to_offer", \
    "user_wk4_viewed_skus_avg_assoc_rules_to_offer", \
    "offer_sku_dept", \
    "offer_sku_mdm_cls", \
    "offer_sku", \
    "qty_bought_allchannels_1wk", \
    "qty_bought_allchannels_4wk", \
    "qty_bought_dotcom_1wk", \
    "qty_bought_dotcom_4wk", \
    "qty_bought_retail_1wk", \
    "qty_bought_retail_4wk", \
    "qty_bought_offerdept_allchannel_1wk", \
    "qty_bought_offerdept_allchannel_4wk", \
    "qty_bought_offerdept_dotcom_1wk", \
    "qty_bought_offerdept_dotcom_4wk", \
    "qty_bought_offerdept_retail_1wk", \
    "qty_bought_offerdept_retail_4wk", \
    "hour_opened", \
    "sku_max_price", \
    "sku_conv_rate", \
    "offer_discount_pct", \
    "offer_price", \
    # actual price of offer
    # historical purchase behavior with discount]
```

Referring again to FIG. 3, in block 306, the offer engine 120 identifies the cluster that the user affinity score belongs to from among the clusters of affinity scores by querying the data store 108 for a previously determined cluster that the user affinity is associated with. In block 308, the offer engine 120 retrieves a beta distribution corresponding to the cluster ID of the identified cluster from the data store 108. The beta distribution is the conjugate prior of the binomial distribution and represents the distribution of the likelihood of response given the presently available data. The data store 108 stores a map maintained by the offer engine 120, which maps each cluster id to a corresponding beta distribution, and keeps track of the response for users belonging to that cluster. In block 310, the offer engine 120 generates a response estimate using the beta distribution. The beta distribution is a probability distribution, and the response estimate is computed by calculating the probability density function which matches the beta distribution. In some implementations, the response estimate can be used to determine whether the offer is sufficiently applicable to the user to be presented.

As an example of the method 300, at runtime, each offer may be associated with a GMNI model which has a specified number of clusters (k). In particular, the data store 108 stores a map maintained by the offer engine 120, which maps each cluster id to a corresponding beta distribution, and keeps track of the response for users belonging to that cluster. Upon receiving an offer request (e.g., a request for a product page), the offer engine 120 computes the "bandit" score for the offer by retrieving user information associated with the user, computes an affinity score to offer using the user information (user_score), passes in the user_score to the GMM associated with the offer to determine which cluster applies (cluster_id=GMM.predict(user_score)). Using the cluster_id returned by the GMM, the offer engine 120 retrieves the appropriate beta distribution and generates a response estimate based thereon (offer.beta_distribution_map.get(cluster_id).sample( )). The response estimates the Bayesian bandit score for that user-offer pair.

Once the offer has been determined, the offer engine 120 may provide data embodying/identifying the offer to the web server 134, and the web server 134 may transmit retrieve, format, process, etc., data associated with the offer to prepare the offer for transmission and/or presentation (e.g., generate and send a response including the offer to a client device 1006). In some instances, the offer may be provided in a web page, a formatted dataset or object (e.g., XML, JSON, etc.), or any other suitable file, object, data format, etc., to a client device. In further instances, the offer may be incorporated into a personalized email campaign, advertising, A/B testing, and/or other online marketing efforts (social media campaigns, etc.), such as implementations involving provision of realtime, personalized content.

As the customer views the offer, the customer's interactions are captured and logged to determine the accuracy of the offer, which can be used by the offer engine 120 to further refine the algorithms discussed herein.

Referring again to FIG. 1, the web server 134 includes computer logic executable by the processor 104 to process content requests. The web server 134 may include an HTTP server, a REST (representational state transfer) service, or other suitable server type. The web server 134 may receive content requests (e.g., page requests, product search requests, HTTP requests, etc.) from client devices 1006, cooperate with the e-commerce application 136 and/or offer engine 120 to determine the content, retrieve and incorporate data from the data store 108, format the content, and provide the content to the client devices 1006.

In some instances, the web server 134 may format the content using a web language and provide the content to a corresponding client application 138 for processing and/or rendering to the user for display, and/or for caching/storage thereby.

The web server 134 may be coupled to the data store 108 to store retrieve, and/or manipulate data stored therein and may be coupled to the e-commerce application 136 to facilitate its operations. For example, the web server 134 may allow a user on a client device 1006 to communicate with the e-commerce application 136 and/or offer engine 120.

The e-commerce application 136 includes computer logic executable by the processor 104 to provide an e-commerce service/marketplace for various products and may store and provide access to product information (e.g., images, descriptions, categories, specifications, reviews, ratings, retailers, etc.) in product data stored in a data store 108. The e-commerce application 136 may also place and provide for order fulfillment for the products including order delivery status and item returns. For example, a user may place orders for and/or pay for products, such as office supplies, consumer electronics, other products, etc., ordered on an e-commerce marketplace using a client device 1006.

The e-commerce application 136 may also receive, manage, analyze, store, and provide access to inventory, sales, rewards, and product data including offers. The e-commerce application 136 may communicate with the offer engine 120 and the web server 134 to facilitate their operations and may be coupled to the data store 108 to store retrieve, and/or manipulate data stored therein. For example, the e-commerce application 136 may retrieve data from a third-party server 1018 and store it in the data store 108.

The client application 138 includes computer logic executable by the processor 104 on a client device 1006 to provide for user interaction, receive user input, present information to the user via a display, and send data to and receive data from the other entities of the system 1000 via the network 1002. In some implementations, the client application 138 may generate and present user interfaces based at least in part on information (e.g., offers, product pages, notifications, messages, other content etc.) received from the e-commerce application 136 and/or the web server 134 via the network 1002. For example, a customer/user 1014 may use the client application 138 to perform product searches, view search results, receive the product pages provided by the e-commerce server 1022, view various products available online, add products to a virtual cart, purchase products, receive discounts on products, etc. In some implementations, the client application 138 includes a web browser and/or code operable therein, a customized client-side application (e.g., a dedicated mobile app), a combination of both, etc.

As depicted, the computing system 100 may include a processor 104, a memory 106, a communication unit 102, an output device 116, an input device 114, and a data store 108, which may be communicatively coupled by a communication bus 110. The computing system 100 depicted in FIG. 1 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 100 may include various operating systems, sensors, additional processors, and other physical configurations. Although, for purposes of clarity, FIG. 1 only shows a single processor 104, memory 106, communication unit 102, etc., it should be understood that these blocks may represent more than one of these components.

The processor 104 may execute software instructions by performing various input, logical, and/or mathematical operations. The processor 104 may have various computing architectures to method data signals including, for example, a complex instruction set computer (CISC) architecture, a reduced instruction set computer (RISC) architecture, and/or an architecture implementing a combination of instruction sets. The processor 104 may be physical and/or virtual, and may include a single core or plurality of processing units and/or cores. In some implementations, the processor 104 may be capable of generating and providing electronic display signals to a display device, supporting the display of images, capturing and transmitting images, performing complex tasks including various types of feature extraction and sampling, etc. In some implementations, the processor 104 may be coupled to the memory 106 via the bus 110 to access data and instructions therefrom and store data therein. The bus 110 may couple the processor 104 to the other components of the computing system 100 including, for example, the memory 106, the communication unit 102, the input device 114, the output device 116, and the data store 108.

The memory 106 may store and provide access to data to the other components of the computing system 100. The memory 106 may be included in a single computing device or a plurality of computing devices. In some implementations, the memory 106 may store instructions and/or data that may be executed by the processor 104. For example, the memory 106 may store one or more of an offer engine 120, a web server 134, an e-commerce application 136, a client application 138, and their respective components, depending on the configuration. The memory 106 is also capable of storing other instructions and data, including, for example, an operating system, hardware drivers, other software applications, databases, etc. The memory 106 may be coupled to the bus 110 for communication with the processor 104 and the other components of computing system 100.

The memory 106 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 104. In some implementations, the memory 106 may include one or more of volatile memory and non-volatile memory (e.g., RAM, ROM, hard disk, optical disk, etc.). It should be understood that the memory 106 may be a single device or may include multiple types of devices and configurations.

The bus 110 can include a communication bus for transferring data between components of a computing device or between computing devices, a network bus system including the network 1002 or portions thereof, a processor mesh, a combination thereof, etc. In some implementations, offer engine 120, web server 134, e-commerce application 136, client application 138, and various other components operating on the computing device 100 (operating systems, device drivers, etc.) may cooperate and communicate via a communication mechanism included in or implemented in association with the bus 110. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 102 may include one or more interface devices (I/F) for wired and wireless connectivity among the components of the system 1000. For instance, the communication unit 102 may include, but is not limited to, various types known connectivity and interface options. The communication unit 102 may be coupled to the other components of the computing system 100 via the bus 110. The communication unit 102 may be coupled to the network 1002, depending on the configuration. In some implementations, the communication unit 102 can link the processor 104 to the network 1002, which may in turn be coupled to other processing systems. The communication unit 102 can provide other connections to the network 1002 and to other entities of the system 1000 using various standard communication protocols.

The input device 114 may include any device for inputting information into the computing system 100. In some implementations, the input device 114 may include one or more peripheral devices. For example, the input device 114 may include a keyboard, a pointing device, microphone, an image/video capture device (e.g., camera), a touch-screen display integrated with the output device 116, etc.

The output device 116 may be any device capable of outputting information from the computing system 100. The output device 116 may include one or more of a display (LCD, OLED, etc.), a printer, a 3D printer, a haptic device, audio reproduction device, touch-screen display, etc. In some implementations, the output device is a display which may display electronic images and data output by the computing system 100 for presentation to a user 106. In some implementations, the computing system 100 may include a graphics adapter (not shown) for rendering and outputting the images and data for presentation on output device 116. The graphics adapter (not shown) may be a separate processing device including a separate processor and memory (not shown) or may be integrated with the processor 104 and memory 106.

The data store 108 is an information source for storing and providing access to data. The data stored by the data store 108 may organized and queried using various criteria including any type of data stored by them, such as product and analytics data (e.g., dependent variables associated with each product, web analytics associated with each product and/or customer, product identifiers, product attributes, product details, product names, where products were purchased from, etc.), user data (e.g., customer accounts, customer identifiers, customer actions, etc.), etc. The data store 108 may include data tables, databases, or other organized collections of data.

The components 120, 134, 136, 138, and/or components thereof (e.g., 122, 124, 126, 120, and/or 132), may be communicatively coupled by the bus 110 and/or the processor 104 to one another and/or the other components 102, 106, 108, 114, and 116 of the computing system 100. In some implementations, the components 120, 134, 136, and/or 138 may include computer logic (e.g., software logic, hardware logic, etc.) executable by the processor 104 to provide their acts and/or functionality. In any of the foregoing implementations, these components 120, 134, 136, and/or 138 may be adapted for cooperation and communication with the processor 104 and the other components of the computing system 100.

The data store 108 may be included in the computing system 100 or in another computing system and/or storage system distinct from but coupled to or accessible by the computing system 100. The data store 108 can include one or more non-transitory computer-readable mediums for storing the data. In some implementations, the data store 108 may be incorporated with the memory 106 or may be distinct therefrom. In some implementations, the data store 108 may store data associated with a database management system (DBMS) operable on the computing system 100. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

FIG. 10 is a block diagram of an example system 1000. The illustrated system 1000 may include a client device 1006a . . . 1006n (also referred to herein individually and/or collectively as 1006), a third-party server 1018, and an e-commerce server 1022, which are electronically communicatively coupled via a network 1002 for interaction with one another, although other system configurations are possible including other devices, systems, and networks. For example, the system 1000 could include any number of client devices 1006, third-party servers 1018, e-commerce servers 1022, and other systems and devices. The client devices 1006a . . . 1006n, and their components, may be coupled to the network 1002 via signal lines 1012a . . . 1012n. The e-commerce server 1022 and its components may be coupled to the network 1002 via signal line 1020. The third-party server 1018 and its components may be coupled to the network 1002 via signal line 1016. The users 1014a . . . 1014n may access one or more of the devices of the system 1000. For example, as depicted, a user 1014a may access and/or interact with the client device 1006a as illustrated by line 1012a, a user 1014b may access and/or interact with the client device 1006b as illustrated by line 1012b, and a user 1014n may access and/or interact with the client device 1006n as illustrated by line 1012n.

The network 1002 may include any number of networks and/or network types. For example, the network 1002 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client device 1006 includes one or more computing devices having data processing and communication capabilities. The client device 1006 may couple to and communicate with other client devices 1006 and the other entities of the system 1000 via the network 1002 using a wireless and/or wired connection. Examples of client devices 1006 may include, but are not limited to, mobile phones, tablets, laptops, desktops, netbooks, server appliances, servers, virtual machines, TVs, etc. The system 1000 may include any number of client devices 1006, including client devices of the same or different type.

A plurality of client devices 1006a . . . 1006n are depicted in FIG. 10 to indicate that the e-commerce server 1022 and its components may aggregate information about and provide optimized price discounts to a multiplicity of users 1014a . . . 1014n on a multiplicity of client devices 1006a . . . 1006n. In some implementations, a single user may use more than one client device 1006, which the e-commerce server 1022 may track and aggregate interaction data associated with the user, which the offer engine 120 may use to performs its acts and/or functions as discussed elsewhere herein. Users may have different habits based on the device they are on, and the e-commerce server 1022 can determine those habits and produce a more optimized experience to the user.

The e-commerce server 1022 may include an instance of the offer engine 120 (the instances of the offer engine 120a . . . 120n may be referred to herein independently and/or collectively as 120). In some configurations, the offer engine 120 may be distributed over the network 1002 on disparate devices in disparate locations or may reside on the same locations, in which case the client device 1006a and/or the e-commerce server 1022 may each include an instance of the offer engine 120. The client devices 1006 may also store and/or operate other software such as a client application 138, an e-commerce application 136, operating system, other applications, etc., that are configured to interact with the e-commerce server 1022 via the network 1002.

The e-commerce server 1022 and the third-party server 1018 have data processing, storing, and communication capabilities, as discussed elsewhere herein. For example, the servers 1022 and/or 1018 may include one or more hardware servers, server arrays, storage devices and/or systems, etc. In some implementations, the servers 1022 and/or 1018 may include one or more virtual servers, which operate in a host server environment. As depicted, the e-commerce server 1022 may include an e-commerce application 136, the offer engine 120, and a web server 134, as discussed elsewhere herein.

Third-party server 1018 can host services such as a third-party application (not shown), which may be individual and/or incorporated into the services provided by the e-commerce server 1022. In some implementations, the third-party application provides additional acts and/or information such as browsing history, tracking information, profile data, shopping data, competitive pricing, competitive offers, web analytics, etc., to the e-commerce server 1022 for storage in the data store 108, which is further described in reference to FIG. 1.

It should be understood that the system 1000 illustrated in FIG. 10 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services. Thus, it should be understood that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the described system(s) may be integrated into a single computing device or system or additional computing devices or systems, etc. In addition, while the system 100 depicted in FIG. 1 provides an example of an applicable computing architecture, it should be understood that any suitable computing architecture, whether local, distributed, or both, may be utilized in the system 100.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 202.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MIMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method for multi-modal determination of an offer executable by a computing system including one or more processors and one or more memories, the method comprising:
   receiving, using the one or more processors, a set of offers;
   computing, using the one or more processors, a plurality of affinity scores measuring affinities of a plurality of users to items included in the offers, wherein computing the plurality of affinity scores comprises:
      computing an item-to-item similarity matrix using a plurality of item-to-item similarity scores based on a plurality of item ratings by a user;
      extracting, responsive to computing the item-to-item similarity matrix, similar items with similar scores from the item-to-item matrix to form a similarity score to the item for each item; and
      combining, responsive to extracting the similar items, similarity scores for the user to create each user affinity score in the plurality of affinity scores;
   building, using the one or more processors and responsive to computing the plurality of affinity scores, an affinity score distribution for each of the offers using the plurality of affinity scores for the plurality of users, wherein the affinity score distribution groups counts of the plurality of users segregated by affinity score to infer a continuous score distribution;
   identifying, using the one or more processors and responsive to building the affinity score distribution, a plurality of clusters of affinity scores for each of the offers using the corresponding affinity score distribution;
   receiving, using the one or more processors, a content request from a client device;
   determining, using the one or more processors, a selected offer including an item;
   receiving, using the one or more processors, clickstream data for a target user associated with the content request;
   computing, using the one or more processors, a target user affinity score to the item of the selected offer using the clickstream data, wherein computing the target user affinity score comprises:
      computing a target user item-to-item similarity matrix using a plurality of item-to-item similarity scores based on a plurality of item ratings by the target user;
      extracting, responsive to computing the target user item-to-item similarity matrix, similar items with similar scores from the target user item-to-item matrix to form similarity scores to the item for each item; and
      combining, responsive to extracting the similar items, similarity scores for the target user to create the target user affinity score;
   identifying, using the one or more processors and responsive to computing the target user affinity score, an identified cluster that the target user affinity score belongs to from among the plurality of clusters of affinity scores for the selected offer, wherein identifying the identified cluster comprises:
      executing, for each offer using the one or more processors, an expectation-maximization (EM) algorithm to fit a Gaussian Mixture Model (GMM) to a score distribution; and
      selecting, using the one or more processors, the GMM with a parameter that maximizes a Bayesian information criterion (BIC) metric;
   retrieving, using the one or more processors and responsive to identifying the identified cluster, a beta distribution corresponding to a cluster ID of the identified cluster from a cluster ID map, wherein the cluster ID map maps each cluster ID to a corresponding beta distribution;
   generating, using the one or more processors and responsive to retrieving the beta distribution, a response estimate using the beta distribution; and
   responsive to receiving the content request and the response estimate exceeding a presentation threshold, automatically transmitting offer content corresponding to the selected offer to the client device, wherein the client device selectively displays the offer content.

2. The method of claim 1, wherein computing affinity scores further comprises:
   determining, using the one or more processors, a set of user features and a set of offer features; and
   executing, using the one or more processors, a predictor model using the set of user features and the set of offer features.

3. A system comprising:
   one or more computer processors;
   one or more non-transitory computer memories storing instructions that, when executed by the one or more computer processors, causes the system to:
   receive a set of offers;
   compute a plurality of affinity scores measuring affinities of a plurality of users to items included in the offers, wherein computing the plurality of affinity scores comprises:
      computing an item-to-item similarity matrix using a plurality of item-to-item similarity scores based on a plurality of item ratings by a user;

extracting, responsive to computing the item-to-item similarity matrix, similar items with similar scores from the item-to-item matrix to form a similarity score to the item for each item; and combining, responsive to extracting the similar items, similarity scores for the user to create each user affinity score in the plurality of affinity scores;

build, responsive to computing the plurality of affinity scores, an affinity score distribution using the plurality of affinity scores for the plurality of users for each of the offers, wherein the affinity score distribution groups counts of the plurality of users segregated by affinity score to infer a continuous score distribution;

identify, responsive to building the affinity score distribution, a plurality of clusters of affinity scores for each of the offers using the corresponding affinity score distribution;

receive a content request from a client device of a target user;

receive clickstream data for the target user;

compute a target user affinity score to an item of a selected offer based on the clickstream data of the target user;

identify an identified cluster that the target user affinity score belongs to from among the plurality of clusters of affinity scores for the selected offer, wherein, to identify the identified cluster, the system:

executes, for each offer, an expectation-maximization (EM) algorithm to fit a Gaussian Mixture Model (GMM) to a score distribution; and selects the GMM with a parameter that maximizes a Bayesian information criterion (BIC) metric; and automatically transmit, responsive to receiving the content request, offer content corresponding to the selected offer to the client device; and the client device configured to selectively display the offer content corresponding to the selected offer based on the identified cluster of affinity scores from the plurality of clusters of affinity scores, wherein the identified cluster of affinity scores corresponds to the target user affinity score of the target user of the client device.

4. The system of claim 3, the memory further storing instructions that, when executed by the one or more computer processors, cause the system to:

determine the selected offer including the item;

retrieve the clickstream data for the target user associated with the content request;

retrieve, responsive to identifying the identified cluster, a beta distribution corresponding to a cluster ID of the identified cluster from a cluster ID map, wherein the cluster ID map maps each cluster ID to a corresponding beta distribution; and generate, responsive to retrieving the beta distribution, a response estimate using the beta distribution, wherein the selected offer is selectively displayed based on the response estimate exceeding a presentation threshold.

5. The system of claim 4, the memory further storing instructions that, when executed by the one or more computer processors, cause the system to:

determine to present the selected offer to the target user based on the response estimate.

6. The system of claim 3, wherein to compute affinity scores, the system:

determines a set of user and offer features; and executes a predictor model using the set of user and offer features.

7. The system of claim 4, wherein to compute the target user affinity score, the system:

computes a target user item-to-item similarity matrix using a plurality of item-to-item similarity scores based on a plurality of item ratings by the target user;

extracts, responsive to computing the target user similarity matrix, similar items with similar scores from the target user item-to-item matrix to form a similarity score to the item for each item; and combines, responsive to extracting the similar items, similarity scores to create the target user affinity score.

8. A method for multi-modal determination of an offer executable by a computing system including one or more processors and one or more memories, the method comprising:

receiving a set of offers;

computing a plurality of affinity scores measuring affinities of a plurality of users to items included in the offers, wherein computing the plurality of affinity scores comprises:

computing an item-to-item similarity matrix using a plurality of item-to-item similarity scores based on a plurality of item ratings by a user;

extracting, responsive to computing the item-to-item similarity matrix, similar items with similar scores from the item-to-item matrix to form a similarity score to the item for each item; and combining, responsive to extracting the similar items, similarity scores for the user to create each user affinity score in the plurality of affinity scores;

building, responsive to computing the plurality of affinity scores, an affinity score distribution for each of the offers using the plurality of affinity scores for the plurality of users, wherein the affinity score distribution groups counts of the plurality of users segregated by affinity score to infer a continuous score distribution;

identifying, responsive to building the affinity score distribution, a plurality of clusters of affinity scores for each of the offers using the corresponding affinity score distribution;

receiving a content request from a client device of a target user;

receiving clickstream data for the target user;

computing a target user affinity score to an item of a selected offer based on the clickstream data of the target user;

identifying an identified cluster that the target user affinity score belongs to from among the plurality of clusters of affinity scores for the selected offer, wherein identifying the identified cluster comprises:

executing, for each offer, an expectation-maximization (EM) algorithm to fit a Gaussian Mixture Model (GMM) to a score distribution; and selecting the GMM with a parameter that maximizes a Bayesian information criterion (BIC) metric; and automatically transmitting, responsive to receiving the content request, offer content corresponding to the selected offer to the client device; and selectively displaying, on the client device, the offer content corresponding to the selected offer based on the identified cluster of affinity scores corresponding to the target user affinity score of the target user of the client device.

9. The method of claim 8, further comprising:

determining the selected offer including the item;

retrieving the clickstream data for the target user associated with the content request;

retrieving, responsive to identifying the identified cluster, a beta distribution corresponding to a cluster ID of the identified cluster from a cluster ID map, wherein the cluster ID map maps each cluster ID to a corresponding beta distribution; and generating, responsive to retrieving the beta distribution, a response estimate using the beta distribution, wherein the selected offer is selectively displayed based on the response estimate exceeding a presentation threshold.

10. The method of claim 9, further comprising:

determining to present the selected offer to the target user based on the response estimate.

11. The method of claim 8, wherein computing affinity scores comprises:

determining a set of user and offer features; and executing a predictor model using the set of user and offer features.

12. The method of claim 9, wherein computing the target user affinity score comprises:

computing a target user item-to-item similarity matrix using a plurality of item-to-item similarity scores based on a plurality of item ratings by the user;

extracting, responsive to computing the target user similarity matrix, similar items with similar scores from the target user item-to-item matrix to form a similarity score to the item for each item; and combining, responsive to extracting the similar items, similarity scores to create the user affinity score.

13. The method of claim 8, wherein identifying clusters comprises:

executing, for each offer, an expectation-maximization (EM) algorithm to fit a Gaussian Mixture Model (GMM) to a score distribution; and selecting the GMM with a parameter that maximizes the Bayesian information criterion (BIC) metric.

* * * * *